United States Patent Office 3,193,565
Patented July 6, 1965

---

3,193,565
γ-FLUORO-α,β-UNSATURATED CARBOXYLIC ACIDS AND THEIR ESTERS
Rudolf Tschesche, Bonn-Rottgen, Hans Machleidt, Bonn, and Valentin Hartmann, Urfeld, Bonn, Germany, assignors to Olin Mathieson Chemical Corporation, New York, N.Y., a corporation of Virginia
No Drawing. Filed May 31, 1963, Ser. No. 284,382
9 Claims. (Cl. 260—408)

This application is a continuation-in-part of application Serial Number 234,549, filed October 31, 1962, and now abandoned.

This invention relates to the production of γ-fluoro-α,β-unsaturated carboxylic acid esters. It has been found that α-fluoro-substituted ketones will react with triphenyl-carbalkoxy-(or carbophenoxy)methylene phosphines to provide good yields of γ-fluoro-substituted α,β-unsaturated carboxylic acid esters according to the following formula:

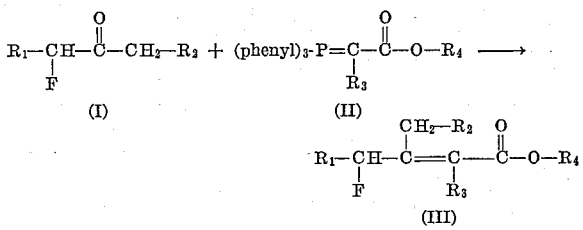

$R_1$ and $R_3$ in the above formulas each represents hydrogen, alkyl or alkenyl. $R_2$ represents hydrogen, alkyl, alkenyl or carbalkoxy. $R_4$ represents alkyl or phenyl.

The alkyl groups in the above formulas are straight or branched chain saturated aliphatic hydrocarbon radicals, preferably having up to about 12 carbon atoms. These include for example methyl, ethyl, propyl, isopropyl, butyl, isobutyl, tertiary-butyl, amyl, hexyl, octyl, dodecyl and the like, but lower alkyl groups are preferred in this group. The alkenyl groups represented by $R_1$, $R_2$ and $R_3$ are unsaturated aliphatic groups having up to about 12 carbon atoms with one or more double bonds in the chain. Preferred are those alkenyl groups with only one double bond and especially lower alkenyl groups. The carbalkoxy groups represented by $R_2$ include lower alkyl groups of the character described previously, preferably lower alkyl groups.

The products of Formula III are prepared by reacting α-fluoro substituted ketones of Formula I with triphenyl carbalkoxy (or carbophenoxy)methylene phosphines of Formula II in organic solvents such as benzene, dimethyl-formamide or lower alkanols such as ethanol. Preferably the starting materials are mixed in a vessel with stirring at room temperature or at an elevated temperature, e.g. from about 40 to about 100° C. Approximately equivalent proportions of the reaction components may be used, but preferably an excess of the phosphine is present. The reactants I and II form an ylide condensation product which, upon standing, decomposes slowly into the product III and triarylphosphine oxide. The decomposition of the ylide is accelerated by heating for several hours. Finally, the triphenylphosphine oxide precipitates in the solvents recommended. The product may then be purified by conventional means such as fractional distillation, distribution in several solvents, chromatography and the like.

The esters of Formula III are useful as intermediates for the synthesis of the corresponding acids (i.e. $R_4$ is then hydrogen) which are formed from the esters of Formula III by hydrolysis with alkali, e.g. alkali metal hydroxides such as sodium hydroxide, potassium hydroxide and the like, alkaline earth metal hydroxides, e.g. magnesium hydroxide, calcium hydroxide and the like. The fluorocarboxylic acids are physiologically active substances useful as antimetabolites, i.e. they have hypocholesteremic activity. Thus they are orally effective for the inhibition of cholesterol biosynthesis and for regulating the level of cholesterol in the blood, e.g. in atherosclerosis or other conditions involving excess cholesterol.

The following examples are illustrative of the invention. All temperatures are expressed in degrees centigrade.

EXAMPLE 1

γ-Fluoro-β-methylcrotonic acid ethyl ester

A. 86 grams of triphenyl-phosphine are dissolved in 400 ml. of dimethylformamide, 55 grams of bromoacetic acid ethyl ester are added and after eight hours of stirring a solution of 7.6 grams of sodium in 150 ml. absolute ethanol is added. The ylide solution is neutral. Thereafter, a solution of 22.8 grams of fluoroacetone in 50 ml. of dimethylformamide is added and heated to 90° for nine hours. After cooling, 1 liter of ice water and 100 ml. of petroleum ether are added, the neutrally reacting solution is shaken and the crystalline triphenyl-phosphine oxide is filtered under suction and washed in petroleum ether. The filtrate is extracted several times with petroleum ether. After the combined petroleum ether extractions are washed with water and the solvent is distilled off, a colorless oil remains which is fractionated in vacuo, yielding 35.2 grams (80%) γ-fluoro-β-methylcrotonic acid ethyl ester, B.P. 10 mm. 59–60°.

Calcd. for $C_7H_{11}FO_2$ (146.2): C, 57.52; H, 7.60. Found: C, 57.48; H, 7.64.

B. 15.2 grams of fluoroacetone and 69.6 grams of tri-phenyl-carbethoxy-methylene phosphine are heated with 100 ml. of absolute benzene to 80° for eight hours. After cooling and adding 400 ml. of petroleum ether, then keeping the material at 0°, the crystallized triphenyl-phosphine oxide is filtered off under suction, the filtrate is concentrated in vacuo and the remaining oil is fractionally distilled in vacuo. The yield of γ-fluoro-β-methylcrotonic acid ethyl ester is 11.5 grams (68%), $B.P._{12}$, 62–64°.

EXAMPLE 2

3-fluoromethyl-7-methyl-2,6-octadienoic acid ethyl ester 7.21 grams of 1-fluoro-6-methyl-5-hepten-2-one and 17.4 grams of triphenyl-carbethoxymethylene phosphine are heated in 50 ml. of absolute benzene to 70° for ten hours. After cooling and precipitating the triphenyl-phosphine oxide with 400 ml. of petroleum ether at 0°, filtering the crystals under suction, and distilling the residue in vacuo, the filtrate yields 5.45 grams (51%) of 3-fluoromethyl-7-methyl-2,6-octadienoic acid ethyl ester, $B.P._{0.4}$, 70–73°.

Calcd. for $C_{12}H_{19}FO_2$ (214.3): C, 67.26; H, 8.94. Found: C, 67.64; H, 8.99.

EXAMPLE 3

4-fluoro-3,7-dimethyl-2,6-octadienoic acid ethyl ester 15.0 grams of 3-fluoro-6-methyl-5-hepten-2-one and 36.2 grams of triphenyl-carbethoxymethylene phosphine are heated in 90 ml. of absolute benzene to 85° for ten hours and, after cooling, petroleum ether is added at 0°. After the triphenyl-phosphine oxide is filtered off under suction and distilling off under suction and distilling off of the solvent an oil remains. Fractional distillation in vacuo yields 13.7 grams (61%) of 4-fluoro-3,7-dimethyl-2,6-octadienoic acid ethyl ester, $B.P._{0.2}$ 63–65°.

Calcd. for $C_{12}H_{19}FO_2$ (214.3): C, 67.26; H, 8.94. Found: C, 67.11; H, 8.76.

EXAMPLE 4

4-fluoro-3,7,11-trimethyl-2,10-dodecadienoic acid ethyl ester 13.7 grams of 3-fluoro-6,10-dimethyl-9-undecen-2-one and 22.3 grams of triphenyl-carbethoxymethylene phosphine are refluxed in 80 ml. of absolute benzene for five hours. After cooling and the addition of 400 ml. of petroleum ether at 0°, triphenyl-phosphine oxide crystallizes. After the crystals are filtered under suction and the solvent is distilled off, distillation of the remaining oil in vacuo yields 11.2 grams (61%) of 4-fluoro-3,7,11-trimethyl-2,10-dodecadienoic acid ethyl ester, B.P.$_{0.3}$ 116°.

Calcd. for $C_{17}H_{29}FO_2$ (284.4): C, 71.79; H, 10.28. Found: C, 72.03; H, 10.42.

EXAMPLE 5

*4-fluoro-3,7,11-trimethyl-2,10-dodecadienoic acid*

Into 10.0 grams of 4-fluoro-3,7,11-trimethyl-2,10-dodecadienoic acid ethyl ester in 100 ml. of methanol, 1.48 grams of sodium hydroxide dissolved in 50 ml. of water are dropped over a period of about three hours. After leaving the solution for two days, it is freed from the methanol in vacuo and after shaking with chloroform, the acid is isolated by adding sulfuric acid and shaking with chloroform. After the solvent is distilled off, vacuum distillation yields 8.15 grams (90%) of 4-fluoro-3,7,11-trimethyl-2,10-dodecadienoic acid, B.P.$_{0.05}$ 139–140°.

Calcd. for $C_{17}H_{29}FO_2$ (256.4): C, 70.27; H, 9.83. Found: C, 69.72; H, 9.94.

EXAMPLE 6

*β-fluoromethylglutaconic acid diethyl ester*

26.2 grams of triphenyl-phosphine are dissolved in 100 ml. of dimethylformamide. Added to this solution, are 16.8 grams of bromacetic acid ethyl ester and, after eight hours of stirring, a solution of 2.3 grams of sodium in 50 ml. of absolute alcohol. Then 14.8 grams of γ-fluoro-acetoacetic acid ester are added. After nine hours of heating to 90° and subsequent cooling, petroleum ether and water are added and, after filtration, the aqueous phase is shaken with petroleum ether several times. After washing the combined petroleum ether phases in some water and drying the solution over magnesium sulfate a yellowish oil remains after the solvent has been distilled off. Distillation in vacuo yields 14.2 grams (63%) of β-fluoromethylglutaconic acid diethyl ester, B.P.$_{0.2}$ 97–99°.

Calcd. for $C_{10}H_{15}FO_4$ (218.2): C, 55.04; H, 6.89. Found: C, 55.10; H, 6.64.

The following are examples showing the preparation of certain of the starting materials used in the preceding examples.

EXAMPLE 7

*2-fluoro-2-acetyl-5-methyl-4-hexenoic acid ethyl ester*

396 g. (2.0 moles) of 2-acetyl-5-methyl-4-hexenoic acid ethyl ester are added with stirring and cooling to a solution of 43.7 g. (1.9 gram atoms) of sodium in 1200 ml. of dry ethanol. 204 g. (2.0 moles) of perchloryl fluoride are then added with vigorous stirring and strong cooling. Sodium chlorate begins to separate immediately. After the reaction is complete, the reaction mixture is neutral. Progress of the reaction is followed by gas chromatography. If unchanged starting material is still present in the alcoholic solution further fluorination is effected by addition of 0.2 gram atoms of sodium and 20 g. (0.2 mole) of perchloryl fluoride in order to convert the starting material which is difficult to separate by distillation.

The precipitated sodium chlorate is separated by filtration under suction and washed with dry ethanol. After concentrating the filtrate in vacuo, water is added and the mixture is acidified with acetic acid. The product is shaken with chloroform, then evaporated. Distillation of the residue gives first 2-fluoro-5-methyl-4-hexenoic acid ethyl ester, Boiling Point 84–87°, then 280 g. (65% of theory) of 2-fluoro-2-acetyl-5-methyl-4-hexenoic acid ethyl ester, boiling point 110°.

Calcd. $C_{11}H_{17}FO_3$ (216.2): C, 61.08; H, 7.93; F, 8.79. Found: C, 61.18; H, 7.81; F, 8.63.

216 grams (1.0 mole) of 2-fluoro-2-acetyl-5-methyl-4-hexenoic acid ethyl ester are heated with stirring in solution of 48 grams (0.12 mole) of sodium hydroxide in 1.4 liters water and 1.4 liters methanol at 40–50° for 2 hours. After cooling, the 3-fluoro-6-methyl-5-hepten-2-one is extracted with petroleum ether. The combined petroleum ether layers are washed with water, dried and evaporated to remove the solvent. The residue, upon distillation in vacuo, yields 104 grams (72% of the theoretical) of fluoroketone boiling at 57°, 10 mm. Hg.

Calcd. $C_8H_{13}FO$ (144.2): C, 66.63; H, 9.08. Found: C, 66.25; H, 8.98.

EXAMPLE 8

*2-fluoroacetyl-5-methyl-4-hexenoic acid ethyl ester*

256 g. (1.73 moles) of ethyl γ-fluoroacetoacetate (J. Chem. Soc. 1959, 3278) and 258 g. (1.73 moles) of β,β-dimethylallyl bromide are mixed and cooled to −10°. A solution of 39.8 g. of sodium in 800 ml. of dry ethanol is added dropwise. After filtering off under suction the precipitated sodium bromide, washing with ethanol and concentrating the filtrate in vacuo at 40°, water is added, the mixture is acidified with acetic acid and the ester is shaken with chloroform. After washing with water, drying and evaporating the solvent in vacuo, distillation of the residual oil in vacuo in a Vigreux column gives 229 g. (61% of theory) of 2-fluoroacetyl-5-methyl-4-hexenoic acid ethyl ester, boiling point 55–58°.

Calcd. $C_{11}H_{17}FO_3$ (216.2): C, 61.08; H, 7.93. Found: C, 61.15; H, 7.80.

262 grams (1.2 moles) of 2-fluoroacetyl-5-methyl-4-hexenoic acid ethyl ester are treated under the conditions described in Example 7 with a solution of 58 grams (1.45 moles) of sodium hydroxide in 1500 ml. of water-methanol 1:1 for 4 hours at 60°. Isolation as in Example 7 yields 45.5 grams (26% of the theoretical) of 1-fluoro-6-methyl-5-hepten-2-one boiling at 71-75°, 10 mm. Hg.

Calcd. $C_8H_{13}FO$ (144.2): C, 66.64; H, 9.08. Found: C, 66.88; H, 9.19.

EXAMPLE 9

*2-fluoro-2-acetyl-5,9-dimethyl-8-decenoic acid ethyl ester*

56.0 g. (0.208 mole) of ethyl α-citronellyl acetoacetate in a solution of 4.8 g. (0.208 gram atom) of sodium in 170 ml. of dry ethanol are treated with 23.4 g. (0.23 mole) of perchloryl to the procedure described in Example 7. Distillation of the residue yields 39.3 g. (66% of theory) of 2-fluoro-2-acetyl-5,9-dimethyl-8-decenoic acid ethyl ester, Boiling Point 110°.

Calcd. $C_{16}H_{27}FO_3$ (286.4): C, 67.20; H, 9.47. Found: C, 67.47; H, 9.51.

53.0 grams (0.18 mole) of 2-fluoro-2-acetyl-5,9-dimethyl-8-decenoic acid ethyl ester are treated under the conditions described in Example 7 with a solution of 8.9 grams (0.22 mole) of sodium hydroxide in 1 liter of water-methanol 1:1. Distillation of the extracted residue yields 29.4 grams (74% of the theoretical) of 3-fluoro-6,10-dimethyl-9-undecen-2-one boiling at 57°, 0.02 mm. Hg.

Calcd. $C_{13}H_{23}FO$ (214.3): C, 72.85; H, 10.82. Found: C, 72.82; H, 11.18.

What is claimed is:

1. A compound of the formula $$R_1-\underset{F}{\underset{|}{CH}}-\underset{R_3}{\underset{|}{C}}(\overset{CH_2-R_2}{\overset{|}{}})=C-\overset{O}{\overset{\|}{C}}-O-R_4$$

wherein $R_1$ and $R_3$ each is a member of the group consisting of hydrogen, alkyl and alkenyl, $R_2$ is a member of the group consisting of hydrogen, alkyl, alkenyl and carbalkoxy, and $R_4$ is a member of the group consiting of hydrogen, lower alkyl and phenyl.

2. A compound of the formula $$\text{alkenyl}-\underset{F}{\underset{|}{CH}}-\overset{CH_3}{\underset{|}{C}}=CH-\overset{O}{\overset{\|}{C}}-\text{O-lower alkyl}$$

3. A compound of the formula

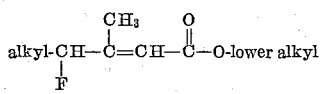

4. γ-Fluoro-β-methylcrotonic acid ethyl ester.
5. 3-fluoromethyl-7-methyl-2,6-octadienoic acid ethyl ester.
6. 4-fluoro-3,7-dimethyl-2,6-octadienoic acid ethyl ester.
7. 4-fluoro-3,7,11-trimethyl-2,10-dodecadienoic acid ethyl ester.
8. 4-fluoro-3,7,11-trimethyl-2,10-dodecadienoic acid.
9. β-Fluoromethylglutaconic acid diethyl ester.

OTHER REFERENCES

Wittig et al.: Chemische Berichte, vol. 87, pp. 1318 to 1330 (1954).

CHARLES B. PARKER, *Primary Examiner.*